US010521592B2

(12) United States Patent
Cooper et al.

(10) Patent No.: US 10,521,592 B2
(45) Date of Patent: Dec. 31, 2019

(54) APPLICATION TRANSLOCATION

(71) Applicant: Apple Inc., Cupertino, CA (US)

(72) Inventors: Simon P. Cooper, Cupertino, CA (US); Julien Oster, San Francisco, CA (US); Robert J. Kendall-Kuppe, San Jose, CA (US); Christopher S. Linn, Palo Alto, CA (US); Jonathan Grynspan, Santa Clara, CA (US); Keith Stattenfield, Davis, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 15/490,838

(22) Filed: Apr. 18, 2017

(65) Prior Publication Data

US 2017/0316211 A1    Nov. 2, 2017

Related U.S. Application Data

(60) Provisional application No. 62/328,549, filed on Apr. 27, 2016.

(51) Int. Cl.
| | | |
|---|---|---|
| *G06F 21/57* | (2013.01) | |
| *G06F 11/20* | (2006.01) | |
| *G06F 8/656* | (2018.01) | |
| *G06F 21/51* | (2013.01) | |
| *G06F 21/56* | (2013.01) | |

(52) U.S. Cl.
CPC ............ *G06F 21/577* (2013.01); *G06F 8/656* (2018.02); *G06F 11/2058* (2013.01); *G06F 21/51* (2013.01); *G06F 21/56* (2013.01)

(58) Field of Classification Search
CPC ........ G06F 21/577; G06F 21/51; G06F 21/56; G06F 8/656
See application file for complete search history.

(56) References Cited

U.S. PATENT DOCUMENTS

| | | | | |
|---|---|---|---|---|
| 6,457,022 | B1 * | 9/2002 | Hutchison | G06F 21/6218 |
| 6,889,228 | B1 * | 5/2005 | Federwisch | G06F 11/2058 |
| 9,613,064 | B1 * | 4/2017 | Chou | G06F 16/182 |
| 10,169,065 | B1 * | 1/2019 | Nye | G06F 9/45558 |
| 2004/0019822 | A1 * | 1/2004 | Knapp, III | G06F 8/60 |
| | | | | 714/6.22 |
| 2006/0236092 | A1 * | 10/2006 | Hamalainen | H04L 63/12 |
| | | | | 713/151 |

(Continued)

OTHER PUBLICATIONS

FreeBSD® The Power to Serve; *FreeBSD System Manager's Manual*, "mount_nullfs", downloaded from the Internet at: http://www.freebsd.org/cgi/man.cgi?mount_nullfs on Apr. 26, 2016 (5 pages).

(Continued)

*Primary Examiner* — Sher A Khan
(74) *Attorney, Agent, or Firm* — Womble Bond Dickinson (US) LLP

(57) ABSTRACT

In one embodiment, a software application that is downloaded from an untrusted source is marked, based on the untrusted classification of the source, to be translocated when the software application is launched. When the software application is launched it is translocated, through a mirroring file system, to a random mount point that is a partial bind mount to the real file system that stores the image of the software application (e.g. the image of the software application's bundle).

24 Claims, 5 Drawing Sheets

(56) References Cited

U.S. PATENT DOCUMENTS

| | | | | |
|---|---|---|---|---|
| 2007/0192375 A1* | 8/2007 | Nakatani | ............ | G06F 11/1662 |
| 2007/0245311 A1* | 10/2007 | Bumgarner | ........... | G06F 9/5027 |
| | | | | 717/120 |
| 2007/0250552 A1* | 10/2007 | Lango | ................. | H04L 67/2842 |
| 2008/0244172 A1* | 10/2008 | Kano | ................. | G06F 11/2069 |
| | | | | 711/112 |
| 2010/0057844 A1* | 3/2010 | Johnson | ............... | G06F 3/0611 |
| | | | | 709/203 |
| 2013/0304705 A1* | 11/2013 | Wong | ..................... | G06F 16/17 |
| | | | | 707/655 |
| 2014/0006357 A1* | 1/2014 | Davis | ................. | G06F 11/1464 |
| | | | | 707/667 |
| 2015/0277856 A1* | 10/2015 | Payne | .................... | G06F 7/588 |
| | | | | 708/255 |
| 2016/0092203 A1* | 3/2016 | Filali-Adib | ........... | G06F 9/4856 |
| | | | | 717/171 |

OTHER PUBLICATIONS

Unix and Linux Stack Exchange; "filesystems—What is a bind mount?", downloaded from the Internet at: http://unix.stackexchange.com/questions/198590/what-is-a-bind-mount on Apr. 26, 2016 (6 pages).

* cited by examiner

APPLICATION TRANSLOCATION

This application claims the benefit of U.S. Provisional Patent Application No. 62/328,549, filed on Apr. 27, 2016, which provisional application is incorporated herein by reference.

BACKGROUND

This disclosure relates generally to security for data processing systems such as computers.

Malware software, such as a computer virus, can sometimes be included with legitimate software, such as software that has been signed by the developer of the software. For example, malware written to appear to be a plug-in software module for the legitimate software can be included with legitimate software in, for example, a zip package (or other package/archive format) that the user expands, and the zip package can include both a signed (and therefore legitimate) software application and a folder containing plug-ins. The malware software can be one of the plug-ins in the folder and can be executed by the software application when it loads one or more plug-ins in the folder. The software application will often cause the plug-in to be loaded by specifying a relative path in the file system (rather than an absolute path) to the plug-in. The present disclosure describes embodiments which can prevent such malware software from being executed.

SUMMARY OF THE DESCRIPTION

A method, in one embodiment, uses random translocation at launch time to prevent a translocated software application, at runtime of the translocated software application, from loading file system resources, such as executable code or data which can be used in attacks, via relative paths in a file system. The method can begin when the software application is downloaded or otherwise obtained. In one embodiment, when downloading application installation media (e.g. a zip package or disk image) from a web browser, email client, messaging or chat application or other untrusted source it can be marked for translocation as it is being downloaded. Then, in one embodiment, when the installation media is accessed for the first time (e.g. by mounting a disk image), if that installation media is properly signed (e.g. with a valid code signature from a trusted authority) or whitelisted, the installation media's contents can be exempted from translocation (and hence can be marked with a "do not translocate bit"). Additionally, in one embodiment, if a single application bundle, by itself (with no other files, folders, or application bundles) is dragged to a new location, then that single application bundle can be exempted from translocation.

In one embodiment, an application, that has not been previously exempted from translocation, is translocated, only at launch time, to a random location by using a universally unique identifier (UUID) that is created as a random number or character string and inserted into a path (in a mirroring file system) as the mount point from which to launch the application. The mount point is randomly created in one embodiment and exists as long as the application is executed and then is torn down once the application terminates or quits in one embodiment. The next time the application is launched (if it is still marked with the translocate bit), a new (and different) random mount point will be created in one embodiment to specify a virtual path in the mirroring file system to allow the application to be launched again. In one embodiment, the mirroring file system maps to and partially mirrors the application's directories in a first file system (such as the Hierarchical File System used in Mac OS X) while other applications from trusted sources, such as a valid app store, are not translocated at run time and no partial bind mount is created for such other applications. In one embodiment, the mirroring file system can be implemented to create something similar to a partial bind mount as an alternative view of the portion of the first file system that contains the bundle of the application.

In one embodiment, each time the application is launched (if it has not been previously exempted from translocation) the kernel software of the data processing system (or another trusted software component) will use the mirrored, translocated path, provided in a call, to launch the application from the mirroring file system, rather than the application's original location on the first file system, thus not revealing the actual real path of the application's directories to the launched application. Thus, the translocated application will not be able to access files or paths via relative paths in the directories surrounding the application in its original real first file system location. By launching the application from the translocation point, the application (and the rest of the system) believe the application is executing from the translocation point, even though all the file data is really coming from the original file system location, and the application can still read (and write where allowed) file system resources outside the mirroring file system by absolute path (and thus the application can load libraries provided by the operating system by using the absolute paths for those libraries). The application will in most cases not retrieve the data it expects to retrieve when it attempts a read access by relative paths outside the mirroring file system in one embodiment. In one embodiment, the kernel does not permit writing to files or modifying directories within the mirroring file system. That is, the application has read only privileges to data (e.g. code) in the disk image pointed to by the virtual path.

A method that uses translocation can include, in one embodiment, the following operations: obtaining (e.g. downloading from a web browser) an executable software application from a source; determining whether to mark the software application to be translocated based upon, for example, whether the source is trusted (e.g., on installation of software from a valid app store) or not trusted; receiving an input to launch the software application; and creating, in response to the input to launch the software application, a mount point (e.g., a random mount point) for use in a mirroring file system that is a partial bind mount of a real file system, the mount point being used in the mirroring file system to launch the software application. In one embodiment, the source is classified as trusted or not based upon the method of installation of the software application (such as a trusted installation media or a trusted application delivery channel). In one embodiment, the method can also include the operation: determining whether to exempt the software application from translocation based on one or more rules; the exemption can occur after the marking in one embodiment (e.g. the process of determining whether an exemption applies occurs after an application has been marked for translocation) or the exemption can be determined at the same time that marking is being determined in another embodiment. For example, the software application can be exempted from translocation (even if downloaded from an untrusted source) when the software application was obtained in a disk image that was signed with a valid code signature (e.g. by a trusted authority) or when the software application was obtained in a disk image that is whitelisted. In one embodiment, exemption can also occur in response to a user action that implicitly indicates the user's trust of the software application (e.g., the user drags and drops a single app bundle, containing the software application, by itself to a new location from a downloaded location). In one embodiment, the following sources can be classified as untrusted sources (thereby causing the application to be marked for translocation): (1) downloading, by a web browser or an email application or a messaging application or a calendar application, the software application; or (2) copying the software from a quarantined location. In one embodiment, the trusted sources can include (but are not limited to): (1) downloads from an app store (e.g. through an application configured to search of apps and to receive payment for apps and provide downloads of purchased apps); or (2) previously installed or user approved applications (such as applications installed and run at least once under a prior operating system that did not use translocation); or (3) applications installed by a signed installer application.

In one embodiment, the software application can be translocated (and is not exempted from translocation) in response to at least one of: (1) launching the software application from an untrusted installation media (e.g. unsigned disk image) in the location it was downloaded to; or (2) launching the software application from an expanded zip (or other expanded file that was a compressed file) in the location in which the expansion occurred; or (3) launching the software application from an unsigned and non-whitelisted disk image while the software application is still inside the disk image; or (4) launching the software application from a quarantined file system; or (5) launching the software application from any location if the software application was dragged or relocated from its download location with other files on or in a folder.

In one embodiment, the real path in the real file system to launch the translocated software application is not disclosed, e.g. hidden, from the software application, and the partial bind mount mirrors only a portion of a file hierarchy in the real file system that corresponds to the software applications, so trusted applications do not use a bind mount. In one embodiment, the partial bind mount is temporary and exists only while the translocated software application is running and the mirroring file system is torn down when the translocated software application quits (e.g. the user selects "quit" or "exit") or when terminated (e.g. the kernel or other operating system component forces the application to quit). In one embodiment, each time the translocated application is launched a new random mount point in a mirroring file system is created to create a partial bind mount. The translocation through the mirroring file system can prevent loading of software code or other resources via relative paths. In one embodiment, at least certain application extensions of the software application can be blocked from executing when the software application is translocated (e.g., in one embodiment, translocation can be configured to block execution of application extensions if an application attempts to load an application extension by relative path and that relative path is outside the application's bundle, but certain application extensions, such as PluginKit Plugins, Login Items, and nested applications are allowed to execute if they are inside a translocation application bundle or are accessed by absolute path). In one embodiment, the operating system restricts the access privileges of the software application in the mirroring file system to read only access from non-volatile storage (e.g. hard drive or flash memory).

The methods and systems described herein can be implemented by data processing systems, such as smartphones, tablet computers, desktop computers, laptop computers, smart watches, audio accessories, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
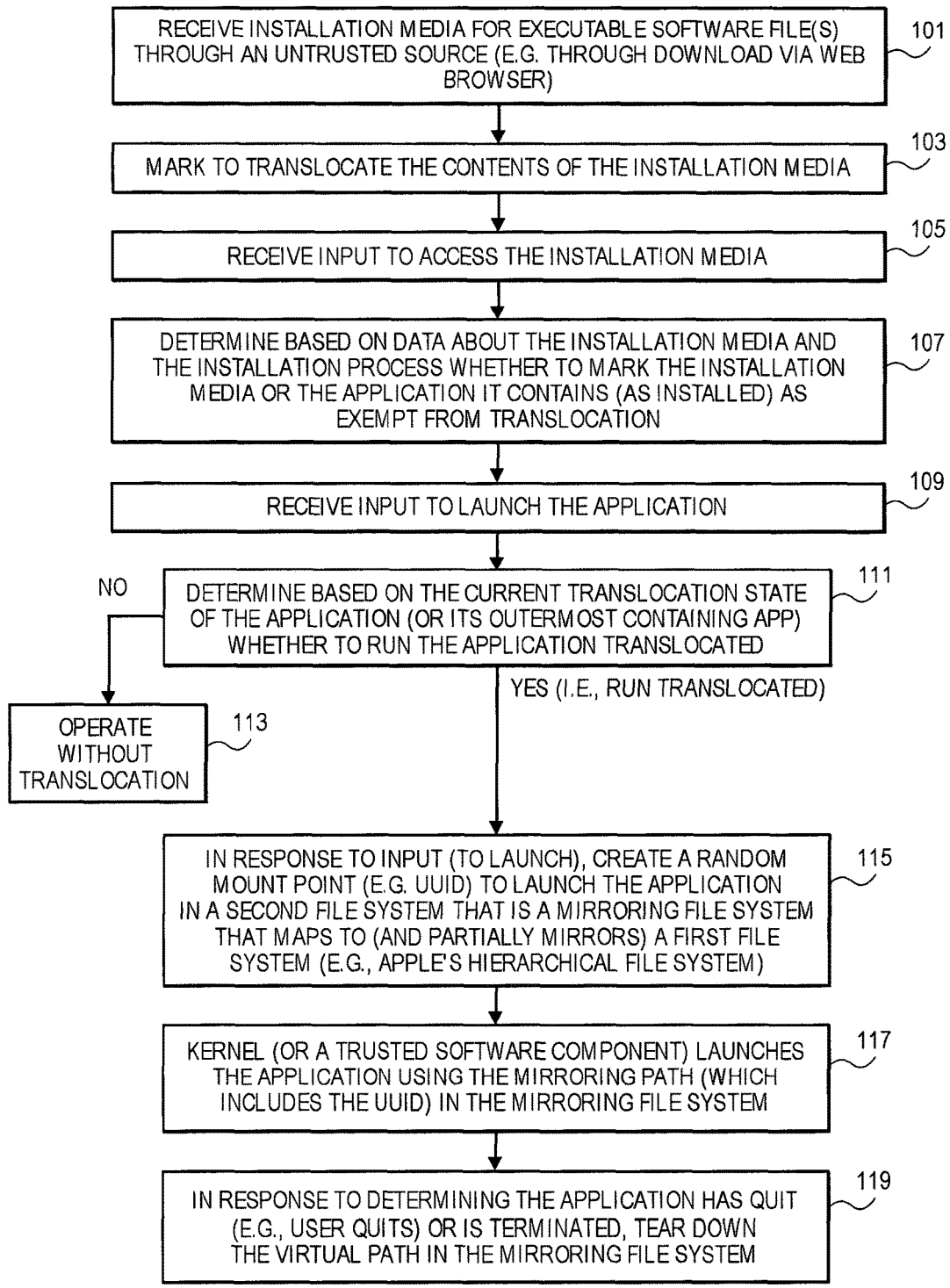
FIG. 1 is a flowchart that shows a method according to one or more embodiments described herein.

An example of a method of one embodiment is shown in FIG. 1. The method can begin in operation 101 in which an installation media (such as a downloaded disk image or a downloaded zip file) is received by a data processing system from an untrusted source. The receipt can occur, in one embodiment, through a download by a web browser or an email application or a messaging or chat application or a calendar application or other applications or can occur through other mechanisms such as a copy operation that copies one or more software applications (in a disk image or a zip file or other formats) from a quarantined file location. The various possible sources (such as different methods of obtaining or installing software) can be classified as untrusted or trusted, and this classification can be used in operation 103 to determine whether to mark the contents of the installation media for translocation based upon the source. If the source is classified as or considered untrusted, then the contents from the source can be marked to be translocated (e.g., set a translocation flag or bit to require translocation). On the other hand, if the source is classified as or considered trusted then operation 103 will not mark the contents for a translocation. For example, if the source is a trusted app store that installs applications with a trusted installer and provides applications with code signatures, then the source is considered trusted and the contents (e.g. an application bundle) will not be marked for translocation and such application can be launched without being translocated (as in operation 113). Other trusted sources can include previously installed or user approved software applications (such as applications installed and run at least once under a prior operating system that did not use translocation) and applications installed by a signed installer application. The mark (e.g., translocation flag or bit) can be used later when a software application in the contents is launched. In one embodiment, the marking for translocation can occur during the process of downloading of the installation media before the downloading is completed, and the mark (e.g. flag or bit) can be stored with a list of attributes of the contents of the installation media. The classifications of sources can be stored, in one embodiment, for use by a security component that is part of an operating system of the data processing system. In operation 105, the data processing system can receive an input to access the installation media. For example, this input can be opening a disk image containing the downloaded contents or unzipping (decompressing) a zip file, etc.

In response to this input received in operation 105, the data processing system can perform operation 107 in one embodiment by determining whether the installation media and its contents should be exempted from translocation even if the translocation mark (in operation 103) was set to cause translocation. In operation 107, data about both the installation process and the installation media can be used to determine, in one embodiment, whether to mark the contents of the installation media as exempt from translocation. In one embodiment, a bit or flag can be used to indicate whether the contents are exempted from translocation, and this bit or flag ("exempt flag") can be separate and distinct from the translocation flag or bit (used in operation 103). Thus, the data processing system can maintain and use both bits or flags, and store them in a set or list of attributes. Both bits or flags can be evaluated in operation 111 to determine whether to execute in a translocated way one of the software applications in the contents of the installation media. In another embodiment, a single translocation flag can be used and can change its state if the data processing system in operation 107 determines to exempt the contents from translocation. For example, if the translocation flag was set to the translocate state in operation 103 and if operation 107 determines that the contents should be exempted from translocation, then the translocation flag is set to the not translocate state in operation 107. Operation 107, in one embodiment, can use a set of rules that specify when to exempt software applications from translocation. For example, a set of rules can include rules such as: (1) software applications in a downloaded installation media can be exempted from translocation when the software application was obtained in a disk image that was signed with a valid code signature (e.g., by a trusted authority) or (2) software applications in a downloaded disk image that is whitelisted can be exempted from translocation or (3) a user's action relative to the software application that explicitly or implicitly indicates trust can exempt from translocation of the software application. A user's action can include a user's setting of a do not translocate option (an explicit indication) or a user's dragging and dropping of a single application bundle by itself from the download location (an implicit indication of trust).

Referring back to FIG. 1, in operation 109 the data processing system receives an input to launch one of the software applications obtained from the installation media in operation 101. This input can be, for example, a user's double clicking on an icon of the software application in an expanded zip folder or an opened disk image, etc. This input causes the data processing system to perform operation 111 in which the data processing system determines the current translocation state of the software application (or its outermost containing application in an application bundle) to determine whether or not to run the software application in a translocated way. For example, if the data processing system uses two flags (such as a translocation flag set in operation 103 and an exempt flag set in operation 107), then the system evaluates both flags to determine whether or not to execute the software application in a translocated way. If the translocation flag is set to require translocation but the exempt flag is set to exempt translocation then the system allows, in operation 113, the software application to run without translocation. If the translocation flag is set to require translocation and the exempt flag is set not to exempt translocation then the system causes operation 115 to be performed to launch and execute the software application in a translocated way. In one embodiment, if the translocation flag is set not to require translocation then the state of the exempt flag is not used, and the software application is allowed, in operation 113, to execute without translocation.

In one embodiment, when the data processing system determines in operation 111 to run the software application in a translocated way, then operations 115, 117 and 119 are performed as shown in FIG. 1. In operation 115, the operating system (e.g. kernel or other software component such as a component in user space) of the data processing system creates a random mount point in one embodiment, which uses a random value that can be a universally unique identifier (UUID) on the system, to launch the software application. The UUID can be inserted into a path in a real file system. Then a mirroring file system is instantiated at this insertion point, creating a mount point from which to launch the translocated application. The mirroring file system can, in one embodiment, create a partial bind mount of a real file system, and the mirroring file system can map to and mirror the entire application bundle that contains the software application. In one embodiment, the application bundle when translocated is not physically moved or copied in storage (e.g. hard disk or flash memory, etc.) but the translocation occurs via a virtual mapping between the mirroring file system and the real file system. The mirroring file system creates a partial bind mount because, in one embodiment, only translocated applications use the mirroring file system (while applications that are not translocated use the real file system), and thus the bind mount is only partial and is restricted to the translocated applications that are running in one embodiment.

Figure 2:
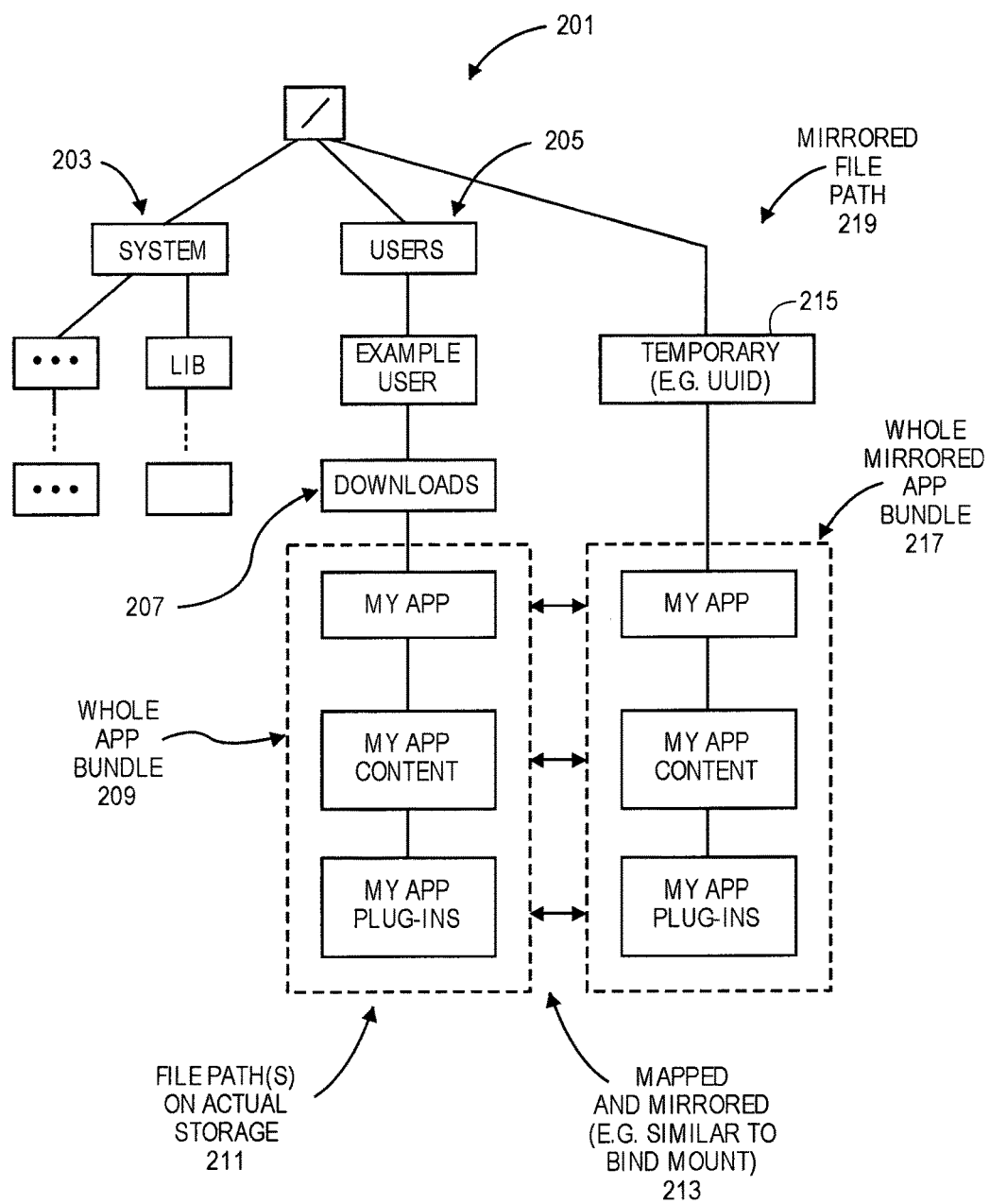
FIG. 2 shows a directory structure for files and other data in a file system according to one or more embodiments described herein.

FIG. 2 shows an example of a partial bind mount 213 for the whole app bundle 209 in the actual file path 211 on non-volatile storage. The directory structure 201 includes, as is known in the art, system directories 203 and one or more user directories such as users directory 205 which includes downloads directory 207 into which downloads (such as downloads from a web browser or email application from untrusted sources) are stored in file paths in the real file system on non-volatile and persistent storage. The whole app bundle 209 is mapped and mirrored to the directory structure of the whole mirrored app bundle 217 through the partial bind mount 213 that is used by the mirroring file system. The UUID 215 created in operation 115 is used as the mount point by the mirroring file system. The UUID 215 can be randomly created every time the "My App" application is launched and can be a universally unique identifier so that at each launch a new random (and different) mount path is used in the mirrored file path 219 for launches of My App in whole app bundle 209.

Figure 3:
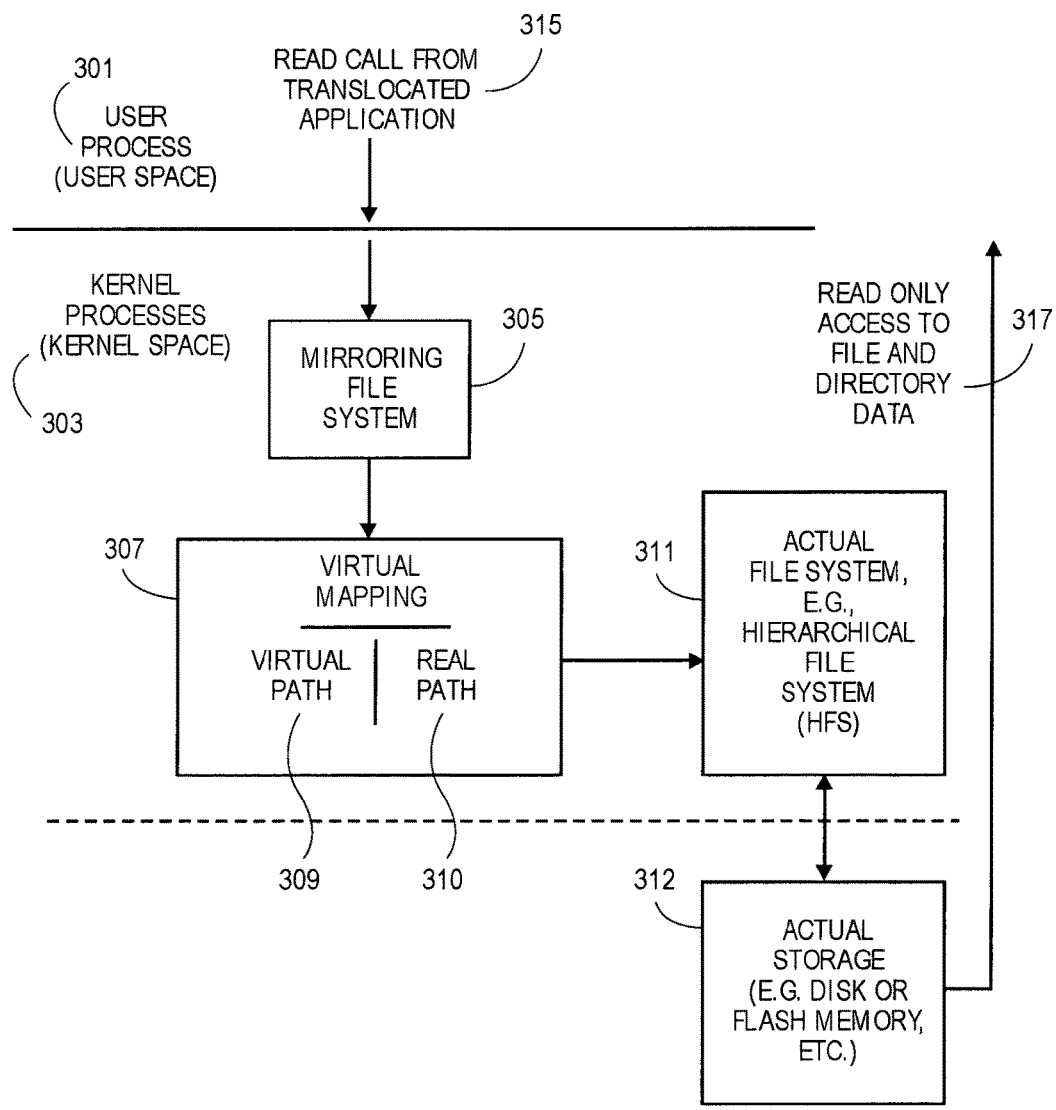
FIG. 3 shows how a mirroring file system provides read only access to files and resources that are mapped through the virtual mapping that the mirroring file system uses.

Referring back to FIG. 1, after operation 115 creates the random mount point, the kernel (or a trusted software component on the data processing system) launches in operation 117 the translocated app (e.g. "My App" in whole app bundle 209) using the mirrored file path (e.g. mirrored file path 219) and the mirroring file system (e.g. the mirroring file system 305 in FIG. 3). The mirroring file system is used thereafter for read operations calls from the software application or other software components. FIG. 3 shows how such calls are processed by the kernel by using a mirroring file system 305 and a virtual mapping 307 to map from a mirrored path to a real path in the actual file. A read call 315 in a user process 301 from the translocated application (such as the translocated "My App" in bundle 209) is received in the kernel processes 303 by mirroring file system 305 which uses virtual mapping 307 to map or translate a mirrored path, such as virtual path 309 to a real path 310 in the actual file system 311 which then can retrieve the code or data or other resource from storage 312 which can then provide the code or data or other resource to the caller which made the read call 315. As long as the translocated application is running or executed, the mirroring file system is used to allow read only access 317, in one embodiment of the resources (including applications, data, etc.) in the translocated app bundle, such as app bundle 209 that is translocated to the mirrored file path 219. In one embodiment, the mirroring file system and the mirrored path is temporary, so that the partial bind mount is also temporary and exists only while the translocated application is executing (in either an active or suspended state). Operation 119 in FIG. 1 enforces this temporary nature by tearing down (e.g. erasing) the mirrored path(s) used by the partial bind mount when the translocated application quits (e.g. the user selects exit or quit) or is terminated (e.g., the operating system kills the translocated application to control/manage memory or life cycles of application programs). The method shown in FIG. 1 can be repeated for any application that is downloaded or otherwise obtained from an untrusted source, and the translocation bit (or a set of bits relating to translocation) can change as described herein (e.g. by a user dragging and dropping an application bundle to an application folder or other location that is different than the initial download location). Applications obtained from a trusted source (e.g. the Mac App Store or other trusted app store) in one embodiment can be exempted from the method of FIG. 1. In one embodiment, a nested application (nested within an outer most application's bundle) can also cause the outer most application in the bundle to be translocated in response to the launching of the nested application in the bundle. In one embodiment, the application when translocated is not physically moved or copied in non-volatile storage (e.g. disk or flash memory); rather the translocation occurs via a virtual mapping between the mirroring file system and the first file system. In one embodiment, the kernel permits only reading from (and not writing to) the files of the application in the mirroring file system.

Figure 4:
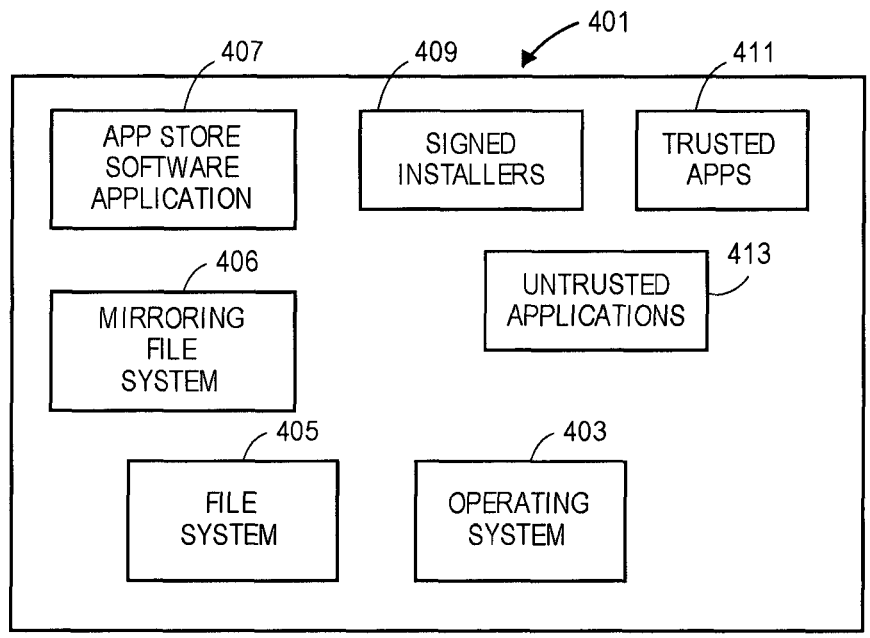
FIG. 4 shows an example of a set of components that can provide for translocation at launch time in one embodiment.

FIG. 4 shows the various possible software components that can be stored in non-volatile storage 401 of a data processing system and can implement one or more embodiments described herein. The app store software application 407 can be a dedicated software application that securely accesses a valid app store and can provide one or more trusted applications 411 from a trusted source which is the valid app store; thus, these trusted applications 411 can operate without translocation. Similarly, one or more signed installers 409 in one embodiment can be used to install software applications that can be considered trusted and thus can provide one or more trusted applications 411 that can operate without translocation. The mirroring file system 406 can provide the virtual mapping 307 and operate with the file system 405 that manages the actual system 311 so that launches of and read accesses for the untrusted applications 413 can operate in a translocated way through control by the operating system 403.

Figure 5:
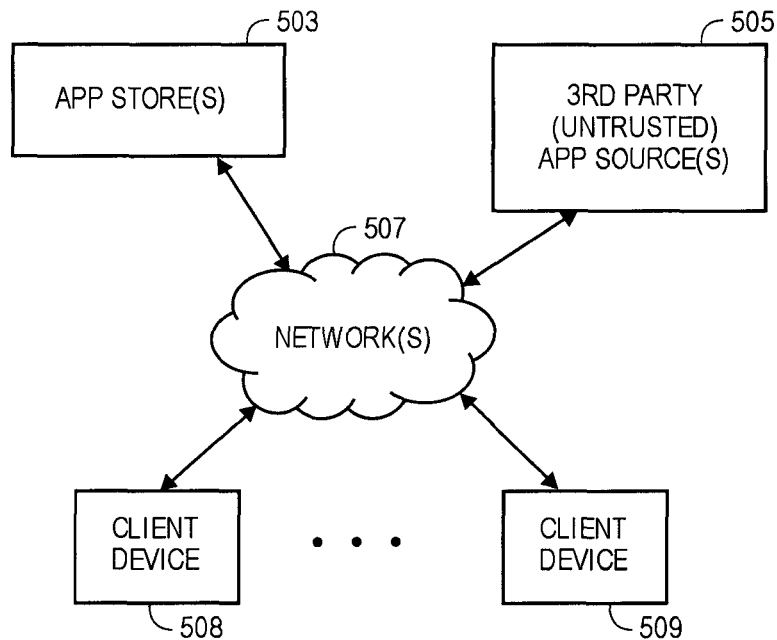
FIG. 5 shows an example of different sources for software applications, where some sources are considered trusted (and therefore software applications from those sources are not translocated) while other sources are not considered trusted (and therefore software applications from those sources are translocated).

FIG. 5 shows examples of how a data processing system, such as client devices 508 and 509, can include both trusted applications (e.g. trusted apps 411) that can operate without translocation and untrusted applications (e.g. untrusted applications 413) that can be forced to operate with translocation. The one or more client devices 508 and 509 can, through one or more networks 507 (e.g. the Internet), download applications from different sources such as one or more app stores 503 that are considered trusted and one or more third party app sources 505 that provide untrusted applications. The one or more app stores 503 may use dedicated app store software (e.g. app store application 407) on each client device to securely search, buy and download from the app stores 503 trusted applications which can be signed and which can be run without translocation; examples of such app stores can include Apple apps stores (e.g. the Mac App Store), Amazon app stores and Google app stores. On the other hand, the one or more app sources 505 can provide untrusted applications (e.g., untrusted applications 413) for download through a web browser (or other applications), and these untrusted applications can be run translocated as described herein. In one embodiment, applications obtained through untrusted installation channels are marked for translocation, and untrusted installation channels can include in one embodiment one or more of (but are not limited to): applications launched from quarantine file systems; or applications downloaded by applications (e.g. web browsers, email applications, etc.) that do not trust what they download; or applications that do not fall under any of the trusted installation channels. In one embodiment, applications obtained through trusted installation channels are not marked for translocation (or are exempted from translocation), and trusted installation channels can include in one embodiment one or more of (but are not limited to): trusted signed disk images; or whitelisted disk images or signed installer packages; or applications downloaded by applications (such as a trusted app store application that allows searching for and downloading applications) that trust what they download, or applications that are dragged by themselves to somewhere other than their download location.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 6:
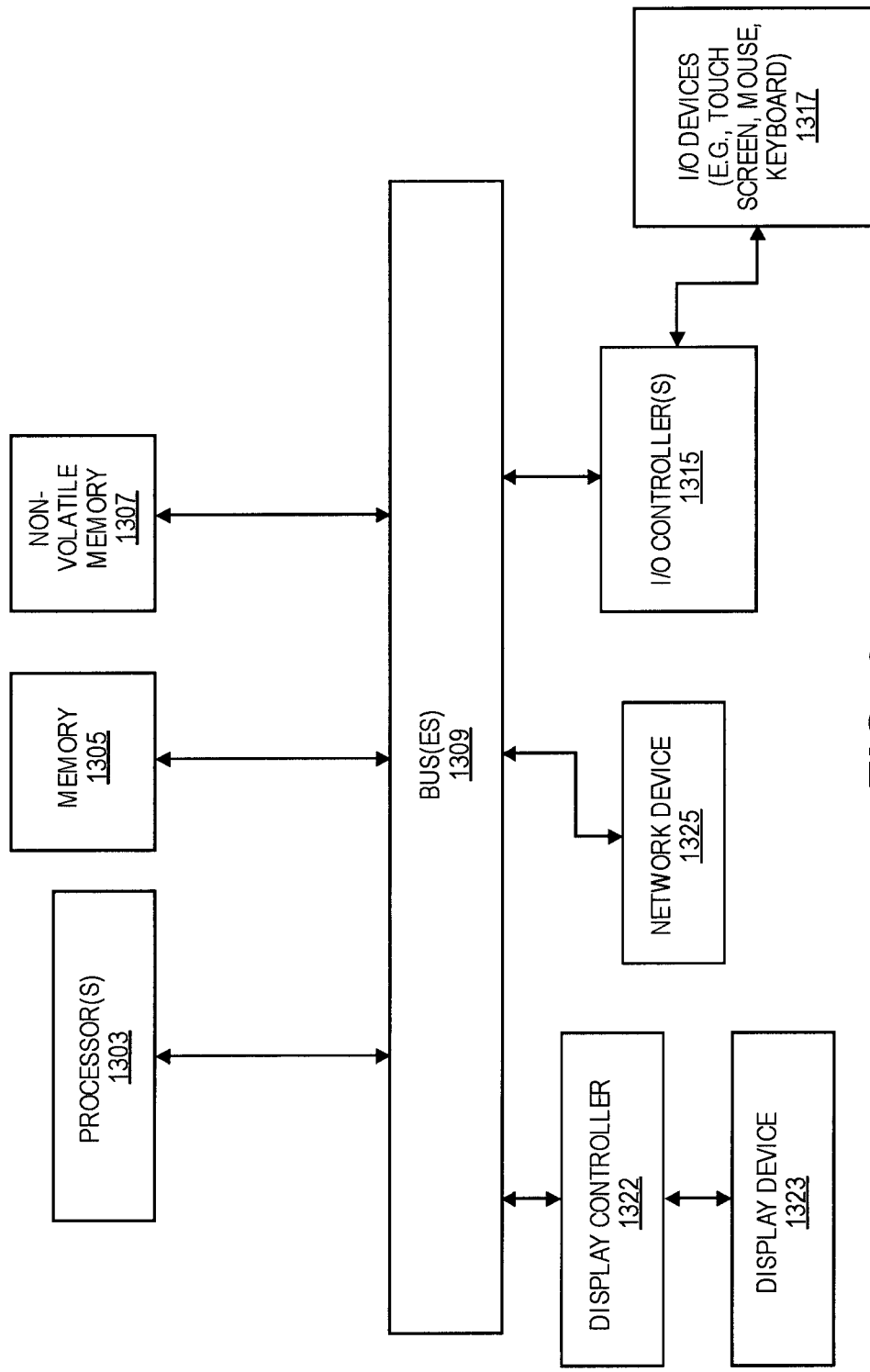
FIG. 6 shows an example of a data processing system that can be used to implement one or more of the embodiments described herein.

FIG. 6 is a block diagram of data processing system hardware according to an embodiment. Note that while FIG. 6 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 6 can also be used with the present invention.

As shown in FIG. 6, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 6 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth) or both.

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
   obtaining an executable software application from a source;
   determining whether to mark the software application to be translocated based upon the source;
   receiving an input to launch the software application; and
   in response to receiving the input to launch the software application, translocating the software application when the software application is marked for translocation by,
   creating a mount point for use in a mirroring file system, the mount point being used in the mirroring file system to launch the software application, and wherein the mirroring file system is a partial bind mount of another file system, a real path in the another file system to launch the software application is not disclosed to the software application, and the partial bind mount mirrors only a portion of a file hierarchy in the another file system, and
   launching the software application using the mount point.

2. The medium as in claim 1 wherein the method further comprises:
   determining whether to exempt the software application from translocation.

3. The medium as in claim 2 wherein the software application is exempted from translocation, even if marked to be translocated during the process of obtaining the software application, when the software application was obtained via trusted installation media or a trusted application delivery channel.

4. The medium as in claim 3 wherein the software application is marked to be translocated before being exempted from translocation and wherein the mount point is a random mount point and wherein determining whether to mark the software application to be translocated comprises determining whether the source is a trusted source or whether a method of installation is classified as a trusted installation.

5. The medium as in claim 4 wherein the software application is exempted from translocation in response to a user action that implicitly indicates the user's trust of the software application and wherein software applications previously installed under a prior operating system are exempted.

6. The medium as in claim 5 wherein the user action that implicitly indicates the user's trust comprises one of: (1) dragging and dropping by the user of a single application bundle, containing the software application, by itself to a new location from a downloaded location; or (2) moving by the user of a single application, which is the software application, by itself to a new location from an old location.

7. The medium as in claim 1 wherein the method further comprises:
   determining whether to exempt the software application from translocation; and
   wherein the obtaining of the software application comprises obtaining the software application from at least one of the following untrusted sources: (1) downloading, by a web browser, the software application; or (2) downloading, by an email application, the software application; or (3) downloading, by a calendar application, the software application; or (4) copying the software application from a quarantined location; or (5) downloading, by a messaging application, the software application and wherein the software application is marked to be translocated when obtained from one of the untrusted sources; and
   wherein the software application is exempted from translocation when the software application was obtained in a disk image that was signed or was obtained in a disk image that is whitelisted; and
   wherein when the source is an installation from a trusted app store the software application is not marked for translocation.

8. The medium as in claim 1 wherein the software application is marked for translocation and is not exempted from translocation for at least one of when: (1) launching the software application from an untrusted installation media in the location it was downloaded to; or (2) launching the software application from an expanded zip in the location in which the expansion occurred; or (3) launching the software application from an unsigned and non-whitelisted disk image while the software application is still inside the disk image; or (4) launching the software application from a quarantined file system.

9. The medium as in claim 1 wherein the partial bind mount is temporary and the mirroring file system is torn down when the software application quits or is terminated and wherein a new random mount point in a mirroring file system is created each time the software application is launched.

10. The medium as in claim 9 wherein translocation through the mirroring file system is performed automatically without user input at launch time of the software application if the source is an untrusted installation channel.

11. The medium as in claim 9 wherein at least a subset of application extensions of the software application is blocked from executing when the software application is translocated.

12. The medium as in claim 1 wherein the access privileges of the software application to software in the mirroring file system are restricted to read only access.

13. A method comprising:
   obtaining an executable software application from a source;
   determining whether to mark the software application to be translocated based upon the source;
   receiving an input to launch the software application; and
   in response to receiving the input to launch the software application, translocating the software application when the software application is marked for translocation by,
   creating a mount point for use in a mirroring file system, the mount point being used in the mirroring file system to launch the software application, and wherein the mirroring file system is a partial bind mount of another file system, a real path in the another file system to launch the software application is not disclosed to the software application, and the partial bind mount mirrors only a portion of a file hierarchy in the another file system, and
   launching the software application using the mount point.

14. The method as in claim 13 wherein the method further comprises:
   determining whether to exempt the software application from translocation.

15. The method as in claim 14 wherein the software application is exempted from translocation, even if marked to be translocated during the process of obtaining the software application, when the software application was obtained via trusted installation media or a trusted application delivery channel.

16. The method as in claim 15 wherein the software application is marked to be translocated before being exempted from translocation and wherein the mount point is a random mount point and wherein determining whether to mark the software application to be translocated comprises determining whether the source is a trusted source or whether a method of installation is classified as a trusted installation.

17. The method as in claim 16 wherein the software application is exempted from translocation in response to a user action that implicitly indicates the user's trust of the software application and wherein software applications previously installed under a prior operating system are exempted.

18. The method as in claim 17 wherein the user action that implicitly indicates the user's trust comprises one of: (1) dragging and dropping by the user of a single application bundle, containing the software application, by itself to a new location from a downloaded location; or (2) moving by the user of a single application, which is the software application, by itself to a new location from an old location.

19. The method as in claim 13 wherein the method further comprises:
   determining whether to exempt the software application from translocation; and
   wherein the obtaining of the software application comprises obtaining the software application from at least one of the following untrusted sources: (1) downloading, by a web browser, the software application; or (2) downloading, by an email application, the software application; or (3) downloading, by a calendar application, the software application; or (4) copying the software application from a quarantined location; or (5) downloading, by a messaging application, the software application; and wherein the software application is marked to be translocated when obtained from one of the untrusted sources; and wherein the software application is exempted from translocation when the software application was obtained in a disk image that was signed or was obtained in a disk image that is whitelisted; and wherein when the source is an installation from a trusted app store the software application is not marked for translocation.

20. The method as in claim 13 wherein the software application is marked for translocation and is not exempted from translocation for at least one of when: (1) launching the software application from an untrusted installation media in the location it was downloaded to; or (2) launching the software application from an expanded zip in the location in which the expansion occurred; or (3) launching the software application from an unsigned and non-whitelisted disk image while the software application is still inside the disk image; or (4) launching the software application from a quarantined file system.

21. The method as in claim 13 wherein the partial bind mount is temporary and the mirroring file system is torn down when the software application quits or is terminated and wherein a new random mount point in a mirroring file system is created each time the software application is launched.

22. The method as in claim 21 wherein translocation through the mirroring file system is performed automatically without user input at launch time of the software application if the source is an untrusted installation channel.

23. The method as in claim 21 wherein at least a subset of application extensions of the software application is blocked from executing when the software application is translocated.

24. The method as in claim 13 wherein the access privileges of the software application to software in the mirroring file system are restricted to read only access.

* * * * *